US011019068B2

(12) United States Patent
Rossman et al.

(10) Patent No.: US 11,019,068 B2
(45) Date of Patent: *May 25, 2021

(54) QUORUM-BASED ACCESS MANAGEMENT

(71) Applicant: Amazon Technologies, Inc., Reno, NV (US)

(72) Inventors: Hart Matthew Rossman, Vienna, VA (US); Erik Lee Swensson, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,783

(22) Filed: May 8, 2019

(65) Prior Publication Data
US 2019/0268342 A1 Aug. 29, 2019

Related U.S. Application Data

(63) Continuation of application No. 15/070,915, filed on Mar. 15, 2016, now Pat. No. 10,291,622.

(51) Int. Cl.
*H04L 29/06* (2006.01)
*G06F 21/40* (2013.01)
*H04L 29/08* (2006.01)

(52) U.S. Cl.
CPC ............ *H04L 63/102* (2013.01); *G06F 21/40* (2013.01); *H04L 63/0876* (2013.01);
(Continued)

(58) Field of Classification Search
CPC ..... H04L 63/102; H04L 63/126; H04L 67/10; H04L 63/20; H04L 63/0876; G06F 21/40
See application file for complete search history.

(56) References Cited

U.S. PATENT DOCUMENTS 6,381,696 B1 ‡ 4/2002 Doyle .................... G06F 21/64
713/156
6,775,668 B1 ‡ 8/2004 Goel ...................... G06F 21/40
(Continued)

OTHER PUBLICATIONS

L. Harn, "Group-oriented (t,n) threshold digital signature scheme and digital multisignature," IEE Proc. Computers and Digital Techniques, 141(5), 1994. (Year: 1994).‡
(Continued)

*Primary Examiner* — Shin-Hon (Eric) Chen
(74) *Attorney, Agent, or Firm* — Hogan Lovells US LLP

(57) ABSTRACT

A quorum-based access mechanism can require multiple entities to provide credentials over a determined period of time in order to obtain access to one or more resources in an electronic environment. This can include receiving a request that is signed by multiple signatories, or receiving multiple requests within a determined period that are each signed by a respective and authorized signatory. In some embodiments the receiving of a primary request causes notifications to be sent to other potential signatories, and a specified or minimum number must respond timely with a signed request to have the access granted. The quorum-based access mechanism can function as an additional authorization layer sitting in front of more conventional authorization and authentication mechanisms. In some embodiments a quorum token can be passed with the request, whereby resources in the environment can make access determinations based on the information in the token.

18 Claims, 8 Drawing Sheets

(52) U.S. Cl.
CPC ............ *H04L 63/126* (2013.01); *H04L 63/20* (2013.01); *H04L 67/10* (2013.01)

(56) References Cited

U.S. PATENT DOCUMENTS

| | | | | |
|---|---|---|---|---|
| 7,136,489 | B1 ‡ | 11/2006 | Madhusudhana | H04L 9/085 380/277 |
| 8,458,487 | B1 * | 6/2013 | Palgon | H04L 63/0807 713/185 |
| 8,566,952 | B1 * | 10/2013 | Michaels | G06F 21/32 726/27 |
| 9,438,421 | B1 ‡ | 9/2016 | Roth | H04L 9/088 |
| 9,723,064 | B1 * | 8/2017 | McKelvie | H04L 67/1097 |
| 9,866,392 | B1 ‡ | 1/2018 | Campagna | H04L 9/3247 |
| 10,095,549 | B1 * | 10/2018 | Needham | H04L 63/083 |
| 10,169,097 | B2 * | 1/2019 | Nishanov | G06F 9/5061 |
| 2005/0204129 | A1 ‡ | 9/2005 | Sudia | G06Q 20/02 713/158 |
| 2006/0041669 | A1 * | 2/2006 | Bemmel | H04L 63/0807 709/229 |
| 2007/0261103 | A1 ‡ | 11/2007 | Viavant | G06F 21/40 726/2 |
| 2010/0313032 | A1 ‡ | 12/2010 | Oswalt | H04L 63/123 713/176 |
| 2012/0117157 | A1 * | 5/2012 | Ristock | G06Q 10/101 709/205 |
| 2013/0291056 | A1 * | 10/2013 | Gaudet | H04W 12/06 726/1 |
| 2014/0337630 | A1 ‡ | 11/2014 | Kimberly | H04L 9/3281 713/176 |
| 2015/0271157 | A1 ‡ | 9/2015 | Ronca | H04L 9/0819 713/168 |
| 2015/0378842 | A1 ‡ | 12/2015 | Tomlinson | G06F 21/40 380/28 |
| 2017/0054756 | A1 ‡ | 2/2017 | Jones | H04L 63/20 |
| 2018/0054316 | A1 ‡ | 2/2018 | Tomlinson | H04L 9/0631 |

OTHER PUBLICATIONS

Non-Final Office Action issued in co-related U.S. Appl. No. 15/070,915 dated Jul. 12, 2018.

L. Harn, "Group-oriented (t,n) threshold digital signature scheme and digital multisignature", IEEE Proceedings of Computers and Digital Techniques, 141(5), 1994.

Notice of Allowance issued in co-related U.S. Appl. No. 15/070,915 dated Jan. 11, 2019.

\* cited by examiner
‡ imported from a related application

QUORUM-BASED ACCESS MANAGEMENT

CROSS-REFERENCE TO RELATED APPLICATIONS

This application is a continuation of allowed U.S. application Ser. No. 15/070,915, entitled "QUORUM-BASED ACCESS MANAGEMENT", filed Mar. 15, 2016, the full disclosure of which is incorporated herein by reference for all purposes.

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Because a resource provider will often provide resource access for many different users, various types of credentials can be used to authenticate a source of a request, as well as to demonstrate that the source is authorized to access one or more resources to perform a task for the request. It might be the case, however, that a source of a request becomes compromised, which can enable an unauthorized party or entity to gain access to those resources, which can have various undesirable consequences, such as access to sensitive data or alteration of various functionality.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of resources in an electronic environment. In particular, various approaches provide a quorum-based access mechanism whereby multiple signatures can be required to obtain access to perform certain tasks in the environment. This can include, for example, receiving signed requests from a specified or minimum number of signatories over a determined period of time in order for the request(s) to be authorized. This can also include receiving coordinated requests from multiple signatories, a single request signed by multiple signatories, or a first request that triggers notifications to other signatories to submit signed requests to enable the initial request to be authorized. The signatories, or callers, can be authenticated and determined to have the appropriate authorization before the request is processed. A quorum-based access service can be implemented at the application programming interface (API) level, as part of an authorization service, or at any other appropriate location in the electronic environment.

Various other such functions can be used as well within the scope of the various embodiments as would be apparent to one of ordinary skill in the art in light of the teachings and suggestions contained herein.

Figure 1:
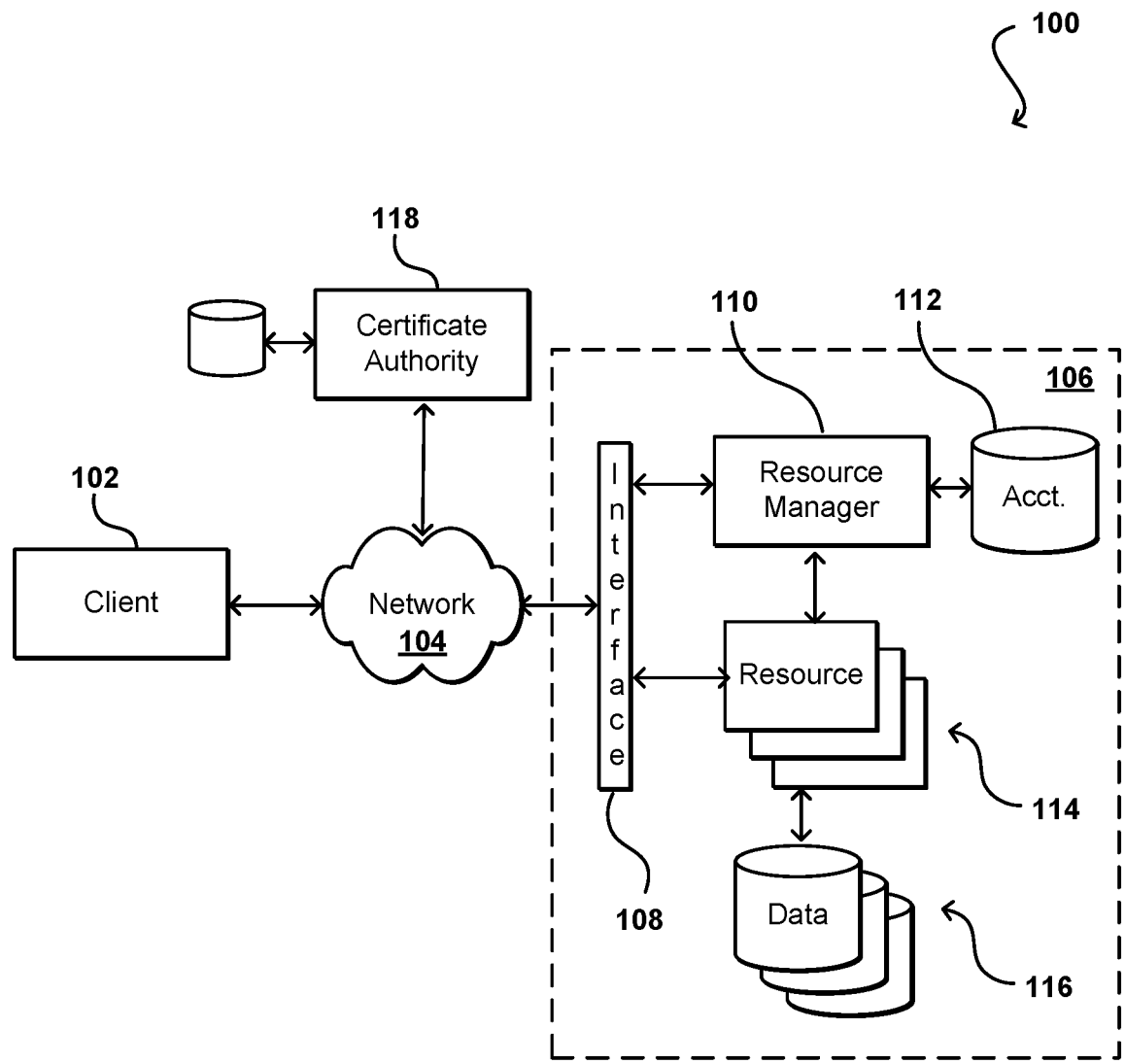
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. An API can include mechanisms for building applications and expressing software components in terms of various inputs, outputs, and other such aspects that are independent of their respective implementations. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an certificate authority 118, a key management service, a corporate entity, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors. In some embodiments the resources or operators within the environment can obtain credentials useful in signing commands or requests for various purposes as discussed and suggested herein. Although illustrated outside the resource provider environment, it should be understood that the certificate authority could be a service offered from within the resource provider environment, among other such options.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, in many conventional systems a single caller, such as a client device 102, will digitally sign a request for access (i.e., to have a task performed) to one or more resources in such an environment, such as by using a symmetric or asymmetric cryptographic key. A request received to an appropriate API of an interface layer 108 can be directed to a component or service such as an authorization manager 206, for example, such as is illustrated in the example situation of FIG. 2. The authorization manager 206 can receive the request, or information for the request, and evaluate the request to determine whether to grant access based on information received, or associated, with the request. It is possible, however, that the calling entity (or a component between the calling entity and the interface) will be compromised or can otherwise cause a request to be received that could enable an otherwise unauthorized party go gain access to the resources associated with the request. In addition, the use of quorum rules can help to protect against faulty requests by unauthorized systems as well, such as may result from system or software faults or modifications that may occur.

In order to minimize the impact or risk of such an entity being compromised, approaches in accordance with various embodiments can require multiple entities to submit requests (or calls, etc.), or sign a single request, for example, before a request can be authorized. Further, in at least some embodiments these actions must occur within a determined period of time in order to enable an authorization decision to be made and/or access authorized. In one example, any number of callers (e.g., humans, applications, or machines) can submit requests to an interface, such as an appropriate API, wherein the execution of each request can depend at least in part upon more than one caller being authenticated and having appropriate authorization. The number of callers required, and the time over which those requests can be received, can be determined using an appropriate quorum rule or other such policy or determination for the respective request.

Figure 2:
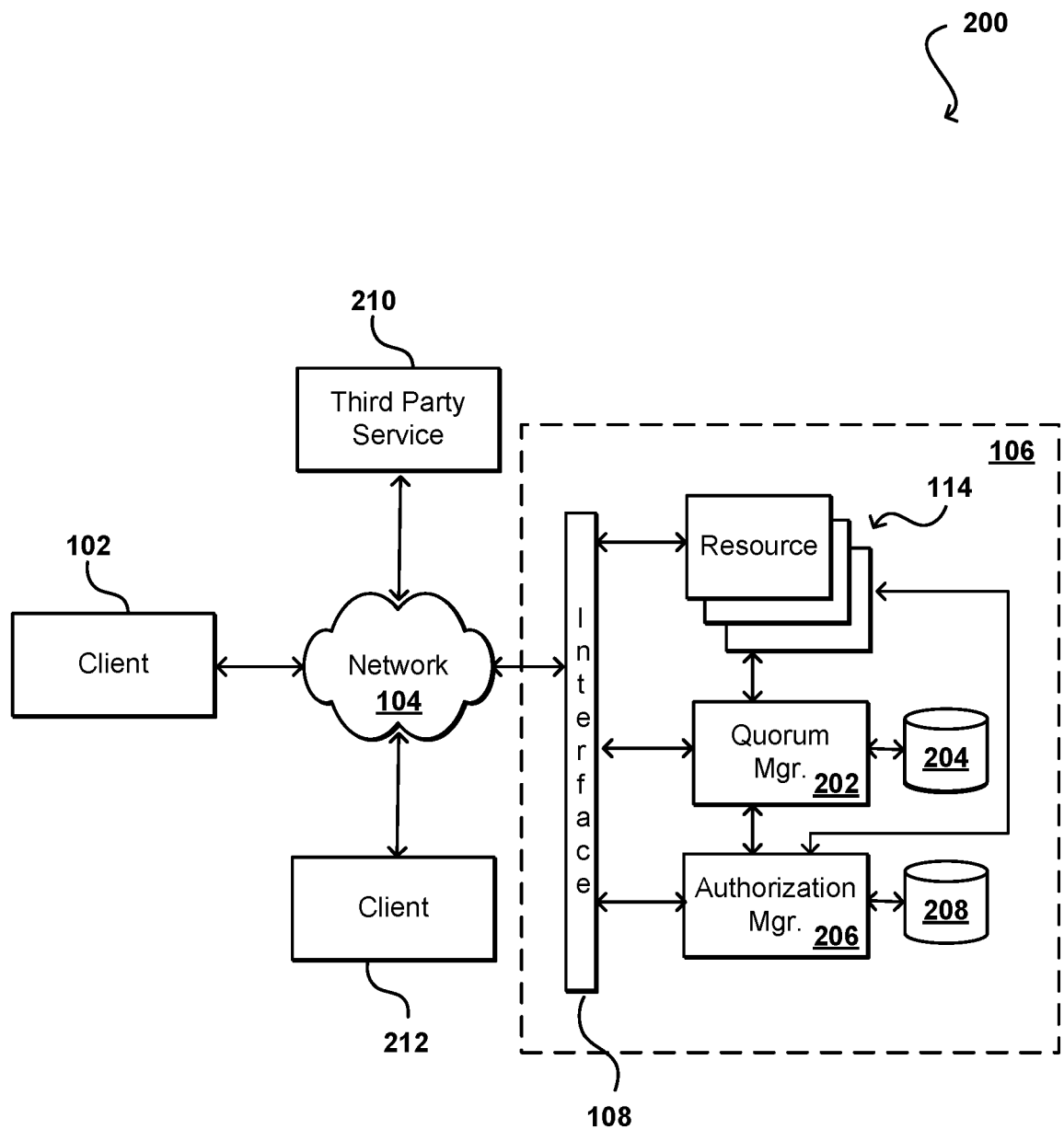
FIG. 2 illustrates an example environment wherein a quorum manager is utilized to ensure that an access request is signed or received from a specified number of sources before making an authorization and/or access decision that can be utilized in accordance with various embodiments.

In the example environment of FIG. 2, the requests can be received from one or more client devices 102, 212 or a third party service 210, among other such sources. One or more of the requests can also be received from resources 114 within the resource provider environment 106. The requests can be received to an interface of the interface layer 108, which can determine whether the request is a type for which quorum rules apply. In some embodiments a specific interface may be provided where requests associated with quorum rules should be sent. Information for the requests can be sent to an application, system, component, or service, such as a quorum manager 202, that can determine the appropriate quorum rules or criteria, as may be stored in a quorum data store 204 or other such location, and determine whether the quorum rules for that type of request are satisfied. If so, the request(s), or information for the request(s), can be forwarded to an authorization manager 206, or other such system or service, to determine, based on authorization criteria or rules stored in an authorization data store 208 or other such location, whether or not the requested access should be authorized. If not, the request(s) can be denied. In some embodiments the quorum manager 202 and authorization manager can be part of the same service, which can enable policies to be set as to which entities are authorized to perform which tasks, at which times, and under which circumstances.

In one example a primary caller, such as a client device, resource instance, or Web service, can submit an API request that is received by the interface layer. The request can be stored (at least cached in resident memory) by the quorum manager for a determined period of time, such as a time determined by the corresponding quorum rule(s). The time may be defined as part of the quorum rules, specified by the request, configured by a customer or administrator, or otherwise specified. Any requests received during that time can be forwarded to the quorum manager 202 and compared against the initial request, caller, or other such information. In some embodiments, the requests or calls are evaluated in the order in which they are received. In other embodiments, all related requests received within the specified period of time are aggregated and then evaluated for authorization. In still other embodiments a request might be received that already is signed by multiple entities, among other such possibilities. In any of these cases, an authorization decision can be made as to whether to deny or approve the requested action or access, and the action can be executed as authorized. As mentioned, the request will need to be signed or otherwise approved by two or more entities, where the number of entities can be fixed, configurable, or specified for each type of access, etc. Each of the callers or entities in at least some embodiments will need to have appropriate authorization in order for the access to be authorized. In some embodiments the authorization is tied to the authorization privileges of the primary caller, while in other embodiments the authorization may be a multi-part authorization, where each caller has a different authorization that, when aggregated, allows the action to be executed. Failure to satisfy the quorum criteria can produce an informal response to the request in some embodiments, or a denial in others, while for any response and audit record may be recorded. Completion of a quorum-based action can also trigger an informational response in at least some embodiments. In some embodiments, a response to a requestor might indicate that a quorum rule was satisfied, and may provide information such as the number of signatures provided. A response to a signatory might include additional or alternative information, as may indicate whether the quorum rule was satisfied, identities of the other signatories, an order in which the requests were received, and other such information.

As mentioned, a benefit of such an approach is that the compromising or fault of an entity will not be sufficient to enable an otherwise unauthorized entity to cause certain tasks to be performed in a resource provider environment. In order to gain access, an entity would need to gain access to a quorum number of authorized callers, which can be of different types, and cause those callers to submit requests within a determined period of time, which can be difficult for entities without intimate knowledge of the environment and the various rule and policies required therein. Even if the callers are both resources within the environment, those resources can be authorized through different authorization mechanisms or have different cryptographic keys, such that an approach used to compromise a first caller would be different from that used to compromise a second caller. The authorization required may also depend at least in part upon the task to be performed, such as to change a firewall setting or open a communication port or channel, among other such options. In some embodiments, the quorum rules might specify one or more requirements of the signatories needed to obtain access. Various quorum criteria can be specified that are compared against metadata for the signatories, approving signatures, or received requests to determine whether those criteria are satisfied. The criteria can specify, for example, that the callers must be of at least two different types having different security approaches or fortifications, such that if one type of security is compromised or has a vulnerability, there will be at least one other type of security required. In some embodiments the types of callers might be specified, or even specific callers in certain circumstances. Other criteria can apply as well, such as the signatories having to be from the same, different, or specified geographic regions or IP addresses, or not from specific geographic regions or addresses. Criteria can specify types of devices from which requests can be authorized or not authorized, such as authorization from notebook computers but not smart phones, and can specify signatories submit requests from at least two types of devices or only the same type of device. Another criterion might require that a proxy device not be used to generate a request, among other such options.

Figure 3:
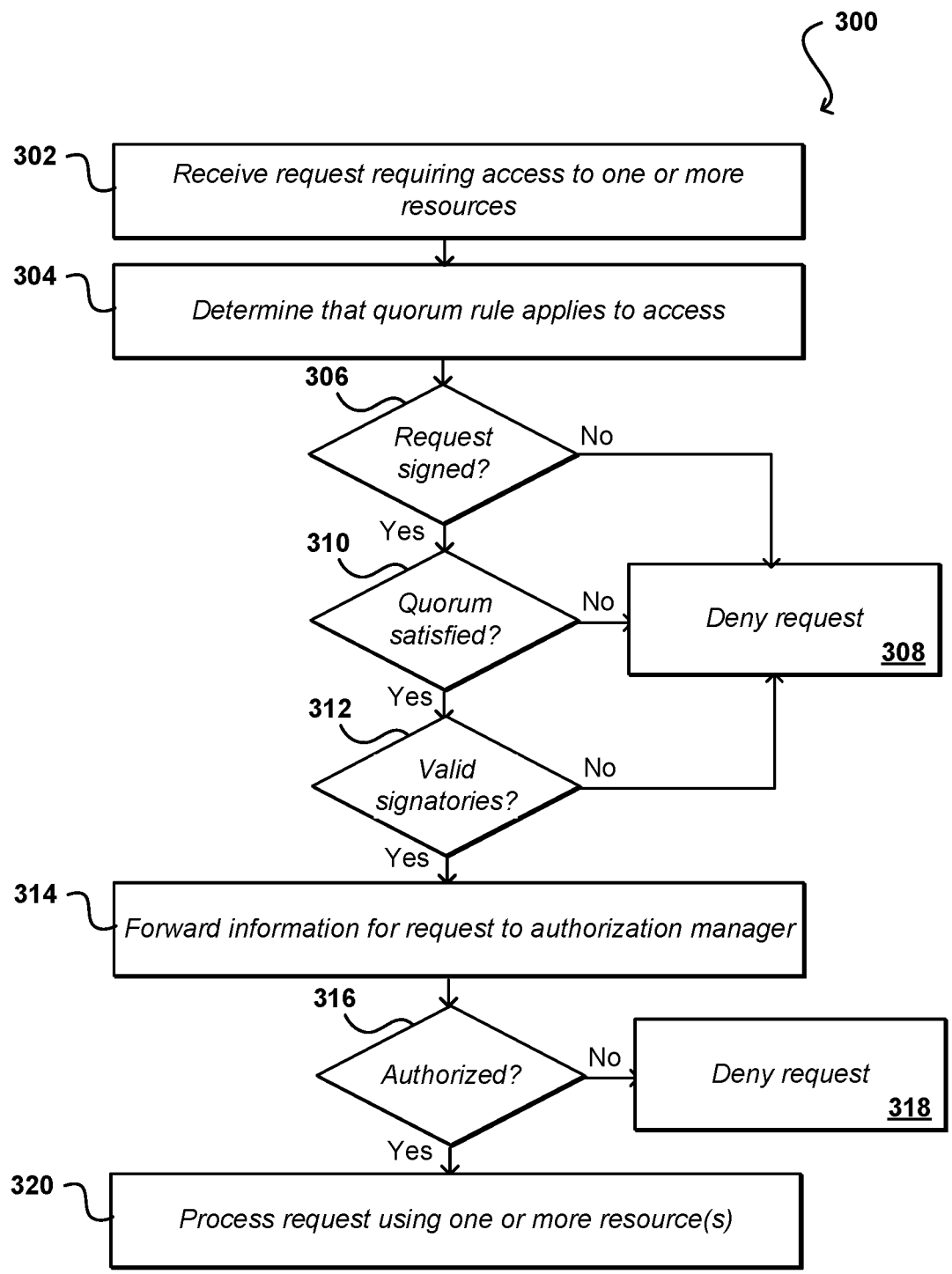
FIG. 3 illustrates a first example process for making a quorum-based access decision that can be utilized in accordance with various embodiments.

FIG. 3 illustrates an example process 300 for authorizing a request for access to one or more resources in a resource provider environment that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a request is received 302 that requires access to one or more resources in a resource provider environment. The request or call can be received to an API for the environment, for example, and can relate to a task to be performed using the one or more resources. A component receiving the request, directly or indirectly, can determine 304 that at least one quorum rule applies for the task or type of access corresponding to the request. In some embodiments a quorum manager or other such service can maintain a list or mapping of quorum rules for specific tasks, resources, access, etc. As mentioned, a quorum rule can specify criteria such as a specific or minimum number of callers or signatories for a request, the types of callers or signatories, a minimum or set number of types, the types of authorization required of each caller or signatory, and other such information as discussed and suggested elsewhere herein. A quorum rule can also specify a period of time for which the requests or calls can be received in order to allow for an authorization decision. For example, a quorum rule might indicate that any and all calls for a specific action must be received within two seconds of each other in order to be considered for authorization.

In this example, a service such as a quorum manager can analyze the request to determine 306 whether the request was signed by at least one appropriate entity. For example, the quorum manager can analyze the request to ensure that the request was signed by at least the caller or other source of the request. If there is no digital signature on the request in this example, the request can be denied 308. In other embodiments an informal notification might be provided, among other such options. If an entity is not authorized, it might be desirable in at least some embodiments to provide minimal information about the reason for the error, in order to avoid giving such information to a compromised source that could attempt to overcome the error based on the reason. The amount of information provided can be configurable, and can differ in some embodiments based on the type of error, type of request, or other such information. Audit or log records might also be generated, as discussed herein. If the request is signed, a determination can be made 310 as to whether the quorum requirement was satisfied by the signature(s). This can include, for example, determining whether the minimum or specified number of digital signatures appear on, or are otherwise associated with, the request. This can also include, in some embodiments, a determination as to whether the signatures are from entities satisfying type or security requirements, among other such options. If not, the request can be denied or otherwise managed as discussed herein. Yet another determination can be made 312, separately or as part of the other determinations, as to whether the signatories for the request are valid and authorized for the request. As mentioned, this can include each of the signatories being authorized for access, or each of the signatories being partially authorized such that the quorum in aggregate is authorized, among other such options. If not, the request can be denied or otherwise handled. If the request is determined to be signed by a quorum or valid signatories as per the corresponding rule(s), information for the request can be forwarded 314 to an authorization manager or other such component, application, system, or service, for a determination as to whether the access for the request is authorized 316. In some embodiments the quorum and authorization analysis may be performed by the same service, or at least concurrently, among other such options. If the access is not authorized, the request can be denied 318 or otherwise managed. If the access is authorized, the request can be processed 320 using the one or more resources. An appropriate notification or response can be generated in at least some embodiments, and audit or log records generated as appropriate.

Figure 4:
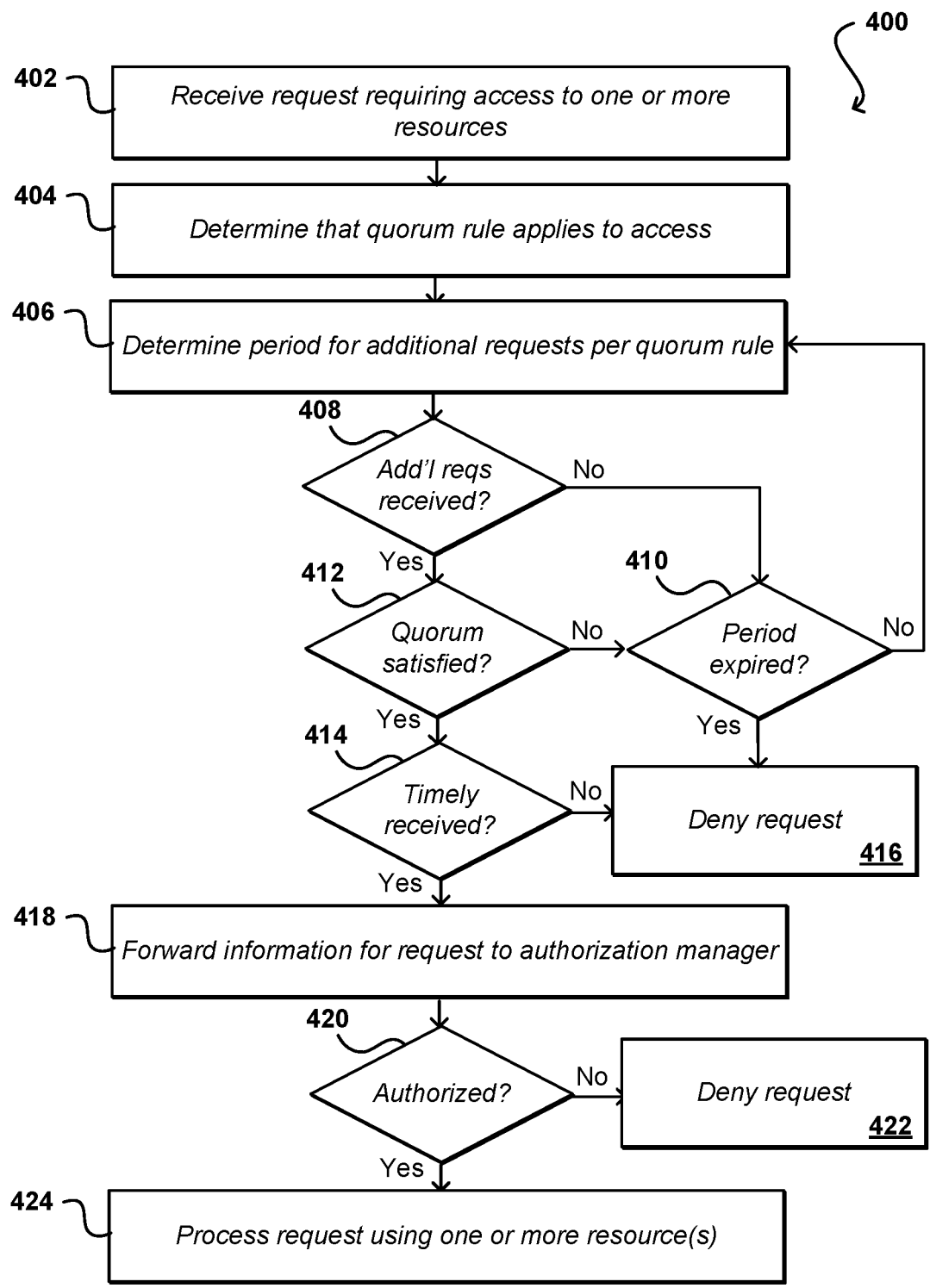
FIG. 4 illustrates a second example process for making a quorum-based access decision that can be utilized in accordance with various embodiments.

In some embodiments, a single request will not be received that includes multiple signatures, but instead multiple requests will be received that relate to the same task. FIG. 4 illustrates an example process 400 for performing an operation in such an embodiment. In this example, a request is received 402 that requires access to one or more resources in a resource provider environment. As mentioned, the request can be received to an API or other appropriate interface and analyzed by an appropriate component of the environment. A determination can be made 404 that at least one quorum rule applies to the access for the request. This can be based upon, for example, the type of task to be performed, the type of resources to be accessed, a type of request or caller, or other such information. In this example, a determination of the applicable quorum rule causes a time period to be determined 406 over which the quorum rule(s) must be satisfied in order for the access to be authorized. This can include, for example, a period of time after the first request is received over which any other request for the access must be received to be considered for the authorization decision. Determining that a quorum rule applies to the access can cause the information for the first request to be cached for at least the period of time in order to be utilized for the authorization decision. An analysis of the first request can be performed before the start of the period, in order to ensure that the first caller is a valid and authorized caller, or such analysis can be performed only if and after a quorum of requests are received, in order to minimize the amount of processing to be performed where the request would otherwise not be authorized.

During the period of time after the first request is received, a determination can be made 408 as to whether any additional related requests have been received. If not, a determination can be made 410 as to whether the period of time has expired. If not, the process can continue in order to enable additional requests to be received during the time period. If the period has expired and a quorum has not been reached, the initial request can be denied and/or an informal message can be sent indicating the lack of a quorum, among other such options. If one or more additional requests have been received, a determination can be made 412 as to whether the quorum rules for the access have been satisfied. This can include, for example, a specified or minimum number of requests and/or calls received with the appropriate signatures and/or from the appropriate sources, or types of sources. If not, and the period has not yet expired, the process can continue. If the period has expired, the request can be denied. If the quorum rules are satisfied, a determination can be made 414 as to whether the requests were timely received, such as received within the time period of the first request. If not, the request can be denied. If so, the requests, or at least information for the first request, can be forwarded 418 to an authorization manager or other such component, application, system, or service, for a determination as to whether the access for the request is authorized 420. In some embodiments the quorum and authorization analysis may be performed by the same service, or at least concurrently, among other such options. If the access is not authorized, the request can be denied 422 or otherwise managed. If the access is authorized, the request can be processed 424 using one or more resources. An appropriate notification or response can be generated in at least some embodiments, and audit or log records generated as appropriate.

Figure 5:
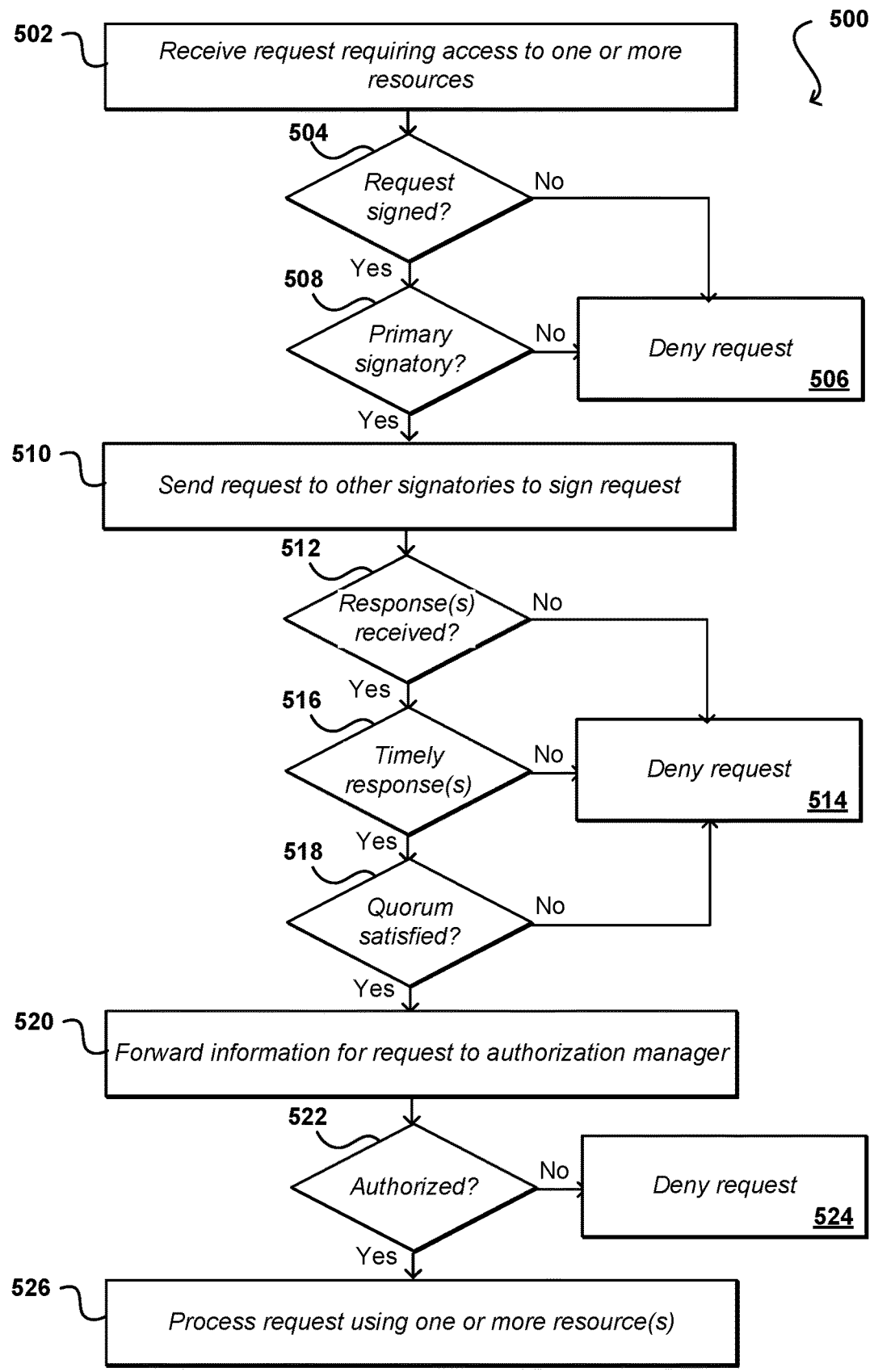
FIG. 5 illustrates a third example process for making a quorum-based access decision that can be utilized in accordance with various embodiments.

The approach described with respect to FIG. 4 requires at least some coordination amongst the callers, such that the appropriate calls or requests are generated at the appropriate times to be received within the determined time period of each other. In some embodiments, the receiving of a request can trigger one or more notifications to potential callers that a request has been received that requires additional requests, calls, or signatures, etc. In the example process 500 of FIG. 5, an initial request is received 502 for a task to be performed that requires access to one or more resources in a resource provider environment. A first determination can be made 504 as to whether the request is digitally signed or otherwise includes information necessary for an authorization determination to be made. If not, the request can be denied 506 or otherwise processed. If the request is signed, a determination can be made 508 (separately or as part of the same determination step) as to whether the caller that signed the request is a primary signatory, at least for embodiments where a primary signatory is designated. If the caller is not a primary signatory where one is required to submit the first request for access, the request is denied. If the caller is a primary signatory, a request can be sent 510 to one or more other signatories to sign the primary request and/or submit additional requests associated with the access. This can include, for example, determining other authorized entities for the type of access that are associated with the primary caller and sending a notification to at least a minimum or determined number of those entities. The notification can include any appropriate information, such as information for the primary caller, information for the type of access requested, information for the end of the time period, etc. The receiving of the request from a primary caller can thus trigger a workflow to contact additional potential callers until either a quorum is received or the period expires, among other such options.

Once the notifications are sent, a determination can be made 512 as to whether any additional related requests or responses have been received. These can be additional requests to perform the actions, requests to countersign the original request, etc. If not, the initial request can be denied 514 and/or an informal message can be sent indicating the lack of a quorum, among other such options. If one or more additional requests have been received, a determination can be made 516 as to whether the requests or responses were timely received, such as received within the time period of the first request. If not, the request can be denied. A determination can also be made 518 as to whether the quorum rules for the access have been satisfied by any additional requests that were timely received. This can include, for example, a specified or minimum number of requests and/or calls received with the appropriate signatures and/or from the appropriate sources, or types of sources. If the requests are to be ordered requests, the determination can include determining whether the requests were received in the appropriate order. If not, and the period has expired, the request can be denied. If the quorum rules are satisfied, the requests, or at least information for the first request, can be forwarded 520 to an authorization manager or other such component, application, system, or service, for a determination as to whether the access for the request is authorized 522. In some embodiments the quorum and authorization analysis may be performed by the same service, or at least concurrently, among other such options. If the access is not authorized, the request can be denied 524 or otherwise managed. If the access is authorized, the request can be processed 526 using the one or more resources. An appropriate notification or response can be generated in at least some embodiments, and audit or log records generated as appropriate.

As mentioned, in some embodiments there might not be a "primary" caller, such that any call received for access that is subject to quorum rules might trigger notifications to be sent to other potential callers to satisfy the quorum rules. In some embodiments the caller system or device might send such notifications before, or substantially concurrent with, the call to the resource provider environment. A quorum manager or other such service can store the information necessary for the authorization decision at least until the end of the period has expired. Appropriate information can be written to an audit log or other such location as discussed herein. In some embodiments the digital signature is used as an authentication for each caller, and once a quorum of authenticated callers is reached the request authorization determination can be made. In some embodiments the authentication enables the appropriate permissions to be determined, which can be used in the authorization decision. The permissions might vary for different types of tasks. For example, an encryption task might be able to be performed by a single caller, but a decryption action might have an associated quorum rule whereby multiple callers are required.

In some embodiments there might be a specified number of callers required per the quorum rules, such as two or three in combination. In some embodiments there might be a minimum number, such as at least two callers within the determined time period. In some embodiments it might be a majority of possible callers, such as at least three of five potential callers. In some embodiments there might be different quorum numbers for different time periods, such as at least two callers over a first time period or at least three callers over a second, longer period. In some embodiments specific callers might be needed, such as where a split key approach is used. A single digital signature might be split into two or more parts, and the owners of those parts are required to provide those parts to be recombined in order to authorize a task to be performed, such as a security change to be initiated. In such an embodiment a minimum number or majority may not suffice, as all the parts of the key must be received, and in some embodiments the parts must be received in the order in which they appear in the combined key, among other such options.

Figure 6:
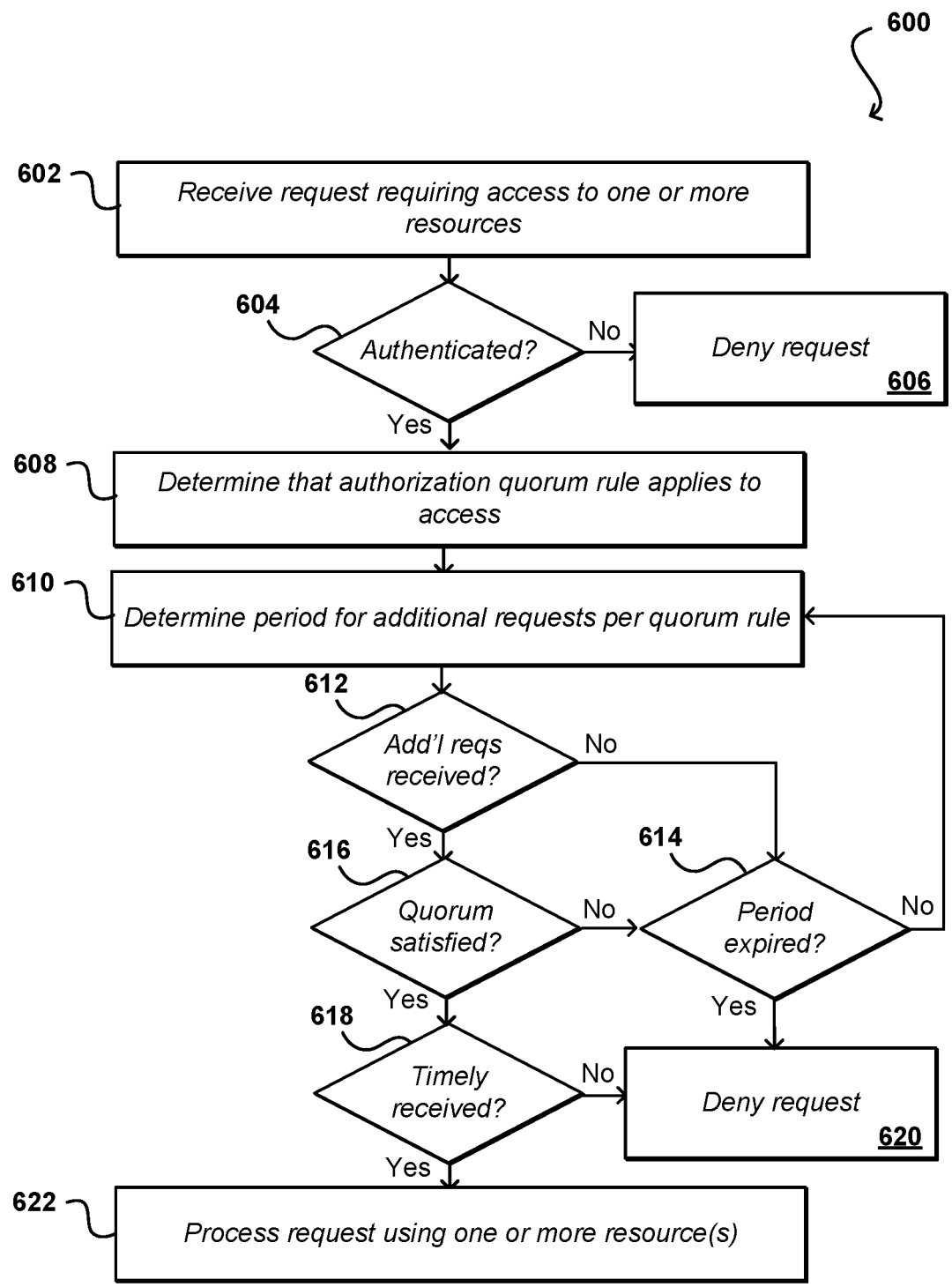
FIG. 6 illustrates a fourth example process for making a quorum-based access decision that can be utilized in accordance with various embodiments.

As an example, the process 600 of FIG. 6 illustrates a situation where a single authenticated request is received that must be validated by multiple signatories in order for access to be granted. In at least some embodiments, the authorization signatories may each hold a portion of a split key. In the example process, a request is received 602 that requires access to one or more resources in a resource provider environment. A determination is made 604 as to whether the request, or source of the request, is authenticated. If not, the request can be denied 606 or otherwise managed. If authenticated, a determination can be made 608 that at least one authorization quorum rule applies to the request. In this example, a determination of the applicable quorum rule causes a time period to be determined 610 over which the quorum rule(s) must be satisfied in order for the access to be authorized. This can include, for example, a period of time after the first request is received over which any other request relating to authorization must be received to be considered for the authorization decision.

During the period of time after the first request is received, a determination can be made 612 as to whether any additional related requests have been received. If not, a determination can be made 614 as to whether the period of time has expired. If not, the process can continue in order to enable additional requests to be received during the time period. If the period has expired and a quorum has not been reached, the request can be denied and/or an informal message can be sent indicating the lack of a quorum, among other such options. If one or more additional requests have been received, a determination can be made 616 as to whether the quorum rules for the access have been satisfied. If not, and the period has not yet expired, the process can continue. If the period has expired, the request can be denied 620. If the quorum rules are satisfied, a determination can be made 618 as to whether the requests were timely received. If not, the request can be denied 620. If so, and all quorum rules or requirements are satisfied (key parts received, authorized signatories, types of signatories, etc.) access for the request can be authorized and the request can be processed 622 using one or more resources. An appropriate notification or response can be generated in at least some embodiments, and audit or log records generated as appropriate.

Figure 7:
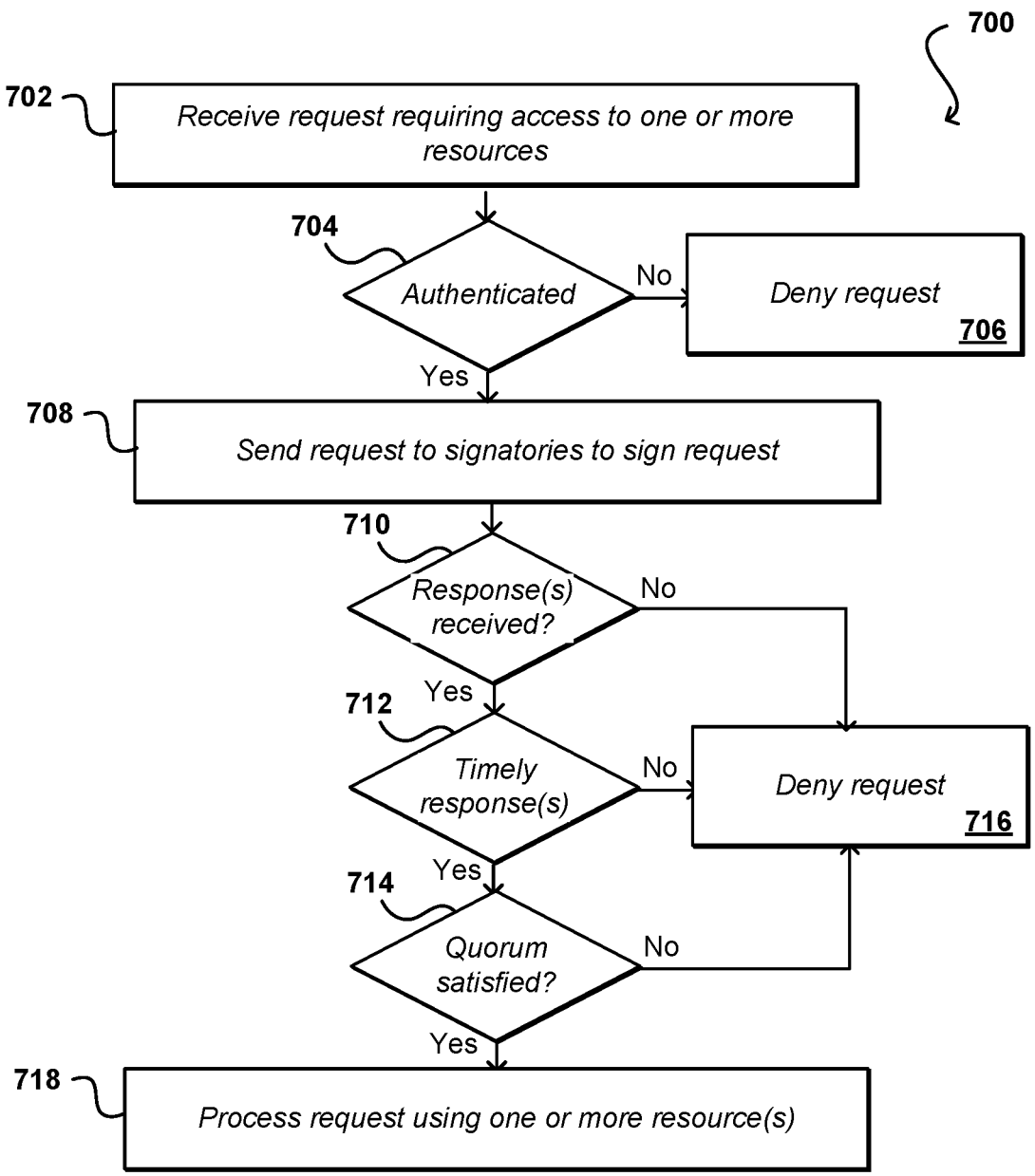
FIG. 7 illustrates a fifth example process for making a quorum-based access decision that can be utilized in accordance with various embodiments.

In some embodiments, the receiving of an authorized request, or authorization of a received request, can trigger one or more notifications to potential callers that a request has been received that requires additional requests, calls, or signatures for authorization. In the example process 700 of FIG. 7, an initial request is received 702 for a task to be performed that requires access to one or more resources in a resource provider environment. A determination is made 704 as to whether the request, or source of the request, is authenticated. If not, the request can be denied 706 or otherwise managed. If authenticated, a request can be sent 708 to one or more other signatories to submit additional requests to authorize the access. Once the notifications are sent, a determination can be made 710 as to whether any additional related requests have been received. If not, the initial request can be denied 716 and/or an informal message can be sent indicating the lack of a quorum, among other such options. If one or more additional requests have been received, a determination can be made 712 as to whether the requests or responses were timely received, such as received within the time period of the first request. If not, the request can be denied. A determination can also be made 714 as to whether the quorum rules for the access have been satisfied by any additional requests that were timely received. If the requests are to be ordered requests, the determination can include determining whether the requests were received in the appropriate order. If not, and the period has expired, the request can be denied 716. If the quorum rules are satisfied, the request can be processed 718 using the one or more resources. An appropriate notification or response can be generated in at least some embodiments, and audit or log records generated as appropriate.

At least some embodiments will provide and/or utilize audit functionality. For each transaction, or request processed, the audit functionality can cause information to be stored such as the source(s) of the signatures provided, the order in which those signatures appeared or were received, etc. The audit functionality can also store additional information as appropriate, such as the location of the access, the resources utilized, the period of time granted, the amount of time needed to reach a quorum, and other such information. In some embodiments, this functionality will be provided by an auditing service that stores the information to a transaction log or other such location.

The introduction of a quorum-based authorization process, or access service, is not a duplication or replacement for existing authorization processes in at least some embodiments, but instead comprises an additional layer of authorization prior to the broad-based authorization that many systems and services provide. If a request fails authorization on quorum-based access, the request is not passed to the broader authorization service, identity manager, or other such component. If the quorum-based access passes, the request can be forwarded to a conventional (or other) authorization system that manages the types of interactions available for the request with respect to the resources in the environment, and adjudicates the interactions with those resources. It should be understood, however, that the quorum-based access functionality can be incorporated into an existing or conventional authorization service in various embodiments. In some embodiments, the quorum-based access call can appear as a standard authorization service call but instead pass through a specific channel where the request is pre-processed by the quorum-based access service.

Certain embodiments can utilize a quorum-based token, or piece of metadata, that flows through with the rest of the call. The presence of a token can enable other systems, for which quorum-based access might be a deciding factor, to choose how to process that request. As an example, a token might include information such as a number of signatories for an original request, as well as information about the signatories or digital signatures. If order matters, the token also can include information about the order, or at least indicate that the signatures or requests were received in the appropriate order. A resource or service receiving the token with a request can determine how to process the request based on the information. For example, if there are five possible signatories and only three sign, this might be sufficient to have the request processed but might cause a resource to only provide a first level of functionality, such as to startup one of a limited set of workloads for a virtual machine. If all five signatories signed the request, however, the token might enable any workload, or at least more sensitive workloads, to be spun up for the request, enable the creation of a new account under which workloads can be launched, etc. Thus, in at least some embodiments the quorum token or quorum metadata can travel with the information for the request for at least a portion of the processing for the request. Such functionality enables the identity of the signatories to be tracked at each level of the processing, making those parties culpable for the actions but also enabling each of those parties to audit each of the actions taken under their signature. Further, in at least some embodiments one of the possible signatories can deny the action or indicate that the request should not be authorized, which can cause the request to be denied or at least limit the type(s) of functionality available for processing the request. A signatory in at least some embodiments can be any appropriate trusted entity, with cryptographic materials in some embodiments, that enables other systems to verify that messages or commands have been sent from, or approved by, that signatory. Signatories can include, for example, a web service, a restricted host machine, a client device, or a human user of resources in the environment. The calls can be signed by the signatories in order to be received and processed by the quorum-based access service. As mentioned, in at least some embodiments a quorum, or other specified or minimum number, of signatories or other trusted operators must sign a command (or call or request) before that command will be processed, in order to maintain the appropriate level of security. This can include, for example, a specified or minimum number of signatories, such as two or at least two signatories. In other embodiments this can include a quorum based upon the number of potential responding signatories. This can include, for example, at least one half of the potential responding signatories, among other such options.

Figure 8:
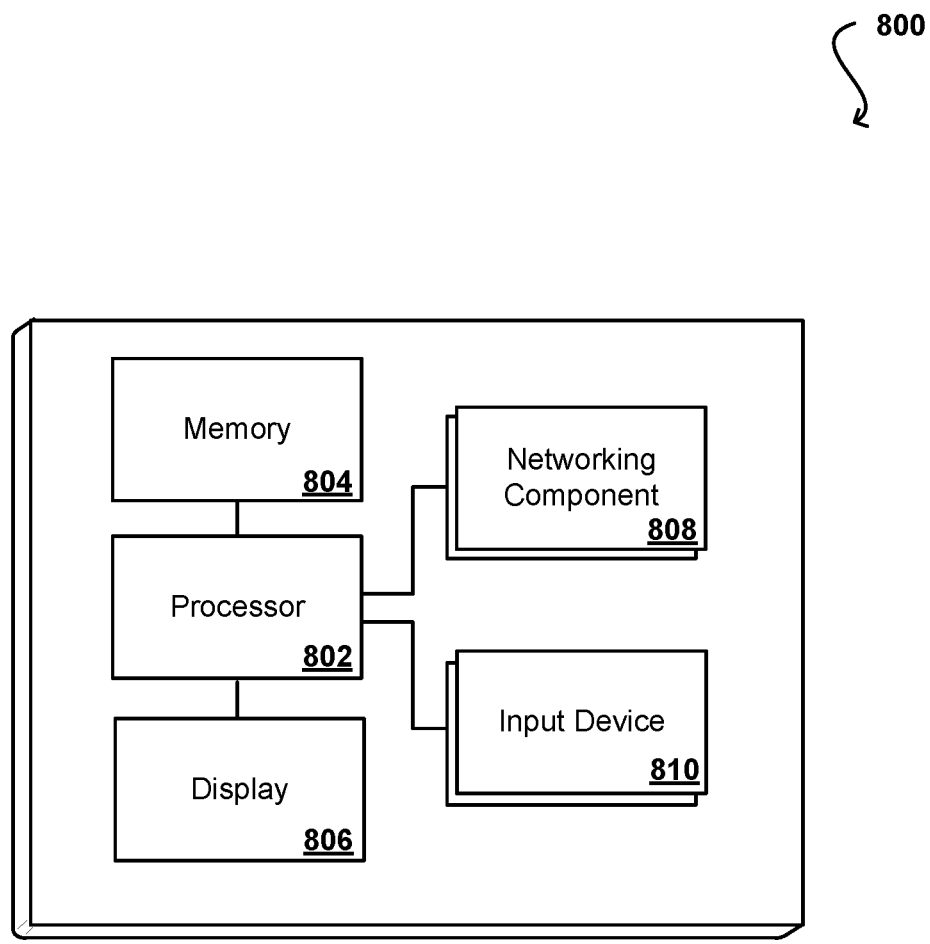
FIG. 8 illustrates example components of a computing device that can be used to implement aspects of various embodiments.

FIG. 8 illustrates a set of basic components of an example computing device 500 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, from a user device, at an application programming interface (API) associated with an access manager, a request for access to one or more resources in a multi-tenant environment;
   determining, by the access manager, at least one of the request or source of the request is authenticated;
   determining, by the access manager, a requested task to be performed on the one or more resources after access to the one or more resources is provided;
   determining, by the access manager, that a quorum rule applies to the task, the quorum rule specifying a period of time for completion of a quorum action for the task;
   determining, by the access manager, that the quorum action was completed within the specified period of time to satisfy the quorum rule for the task;
   permitting the task to be performed on the one or more resources in the multi-tenant environment; and
   storing an audit record for the request, the audit record including at least a number of digital signatures received and an identification of signatories associated with the digital signatures.

2. The computer-implemented method of claim 1, wherein the quorum action comprises receiving a number of additional requests for access, the number including at least one of a specified number or a minimum number.

3. The computer-implemented method of claim 1, further comprising:
   sending a notification, by the access manager, to a number of additional signatories to satisfy the quorum action.

4. The computer-implemented method of claim 3, further comprising:
   receiving a number of additional signature requests from the additional signatories; and
   determining the number of additional signature requests satisfies the quorum rule.

5. The computer-implemented method of claim 3, further comprising:
   determining criteria for the at least one other potential signatory to which the notification is to be sent, the criteria specifying at least one of a type of a potential signatory, a location of a potential signatory, an address of a potential signatory, a device used on behalf of a potential signatory, or whether a proxy device can be used to submit a request on behalf of a potential signatory.

6. The computer-implemented method of claim 1, further comprising:
   receiving a number of additional requests for access;
   determining the number of additional requests is less than a threshold number of the quorum rule;
   receiving a second number of additional requests for access within the specified period of time; and
   determining the number of additional requests and the second number of additional requests satisfies the quorum rule.

7. A system, comprising:
   at least one processor; and
   memory including instructions that, when executed by the at least one processor, cause the system to:
   receive, from a user device at an application programming interface (API) associated with an access manager, a request for access to one or more resources in a multi-tenant environment;
   determine, by the access manager, at least one of the request or source of the request is authenticated;
   determine, by the access manager, a requested task to be performed on the one or more resources after access to the one or more resources is provided;
   determine, by the access manager, that a quorum rule applies to the task, the quorum rule specifying a period of time for completion of a quorum action for the task;
   determine, by the access manager, that the quorum action was completed within the specified period of time to satisfy the quorum rule for the task;
   permitting the task to be performed on the one or more resources in the multi-tenant environment; and
   store an audit record for the request, the audit record including at least a number of digital signatures received and an identification of signatories associated with the digital signatures.

8. The system of claim 7, wherein the quorum action comprises receiving a number of additional requests for access, the number including at least one of a specified number or a minimum number.

9. The system of claim 7, wherein the instructions, when executed further cause the system to:
   send a notification, by the access manager, to a number of additional signatories to satisfy the quorum action.

10. The system of claim 9, wherein the instructions when executed further cause the system to:
    receive a number of additional signature requests from the additional signatories; and
    determine the number of additional signature requests satisfies the quorum rule.

11. The system of claim 9 wherein the instructions, when executed further cause the system to:
    determine criteria for the at least one other potential signatory to which the notification is to be sent, the criteria specifying at least one of a type of a potential signatory, a location of a potential signatory, an address of a potential signatory, a device used on behalf of a potential signatory, or whether a proxy device can be used to submit a request on behalf of a potential signatory.

12. The system of claim 7, wherein the instructions when executed further cause the system to:
    receive a number of additional requests for access;
    determine the number of additional requests is less than a threshold number of the quorum rule;
    receive a second number of additional requests for access within the specified period of time; and
    determine the number of additional requests and the second number of additional requests satisfies the quorum rule.

13. A non-transitory computer-readable storage medium including instructions that, when executed by at least one processor of a computing system, cause the computing system to:
   receive, from a user device at an application programming interface (API) associated with an access manager, a request for access to one or more resources in a multi-tenant environment;
   determine, by the access manager, at least one of the request or source of the request is authenticated;
   determine, by the access manager, a requested task to be performed on the one or more resources after access to the one or more resources is provided;
   determine, by the access manager, that a quorum rule applies to the task, the quorum rule specifying a period of time for completion of a quorum action for the task;
   determine, by the access manager, that the quorum action was completed within the specified period of time to satisfy the quorum rule for the task;
   permitting the task to be performed on the one or more resources in the multi-tenant environment; and
   store an audit record for the request, the audit record including at least a number of digital signatures received and an identification of signatories associated with the digital signatures.

14. The non-transitory computer-readable storage medium of claim 13, wherein the quorum action comprises receiving a number of additional requests for access, the number including at least one of a specified number or a minimum number.

15. The non-transitory computer-readable storage medium of claim 13, wherein the instructions when executed further cause the computing system to:
   send a notification, by the access manager, to a number of additional signatories to satisfy the quorum action.

16. The non-transitory computer-readable storage medium of claim 15, wherein the instructions when executed further cause the computing system to:
   receive a number of additional signature requests from the additional signatories; and
   determine the number of additional signature requests satisfies the quorum rule.

17. The non-transitory computer-readable storage medium of claim 15, wherein the instructions when executed further cause the system to:
   determine criteria for the at least one other potential signatory to which the notification is to be sent, the criteria specifying at least one of a type of a potential signatory, a location of a potential signatory, an address of a potential signatory, a device used on behalf of a potential signatory, or whether a proxy device can be used to submit a request on behalf of a potential signatory.

18. The non-transitory computer-readable storage medium of claim 13, wherein the instructions when executed further cause the system to:
   receive a number of additional requests for access;
   determine the number of additional requests is less than a threshold number of the quorum rule;
   receive a second number of additional requests for access within the specified period of time; and
   determine the number of additional requests and the second number of additional requests satisfies the quorum rule.

* * * * *